United States Patent [19]

Seaburg

[11] Patent Number: 4,947,476
[45] Date of Patent: Aug. 7, 1990

[54] OIL CHECK LIGHT

[76] Inventor: Stephen L. Seaburg, 4021 Cedar Run Rd., Traverse City, Mich. 49684

[21] Appl. No.: 396,367

[22] Filed: Aug. 21, 1989

[51] Int. Cl.⁵ .............................................. F21V 33/00
[52] U.S. Cl. ..................................... 362/109; 362/61; 362/191; 362/208; 362/253; 15/210 B
[58] Field of Search ................. 362/61, 109, 157, 191, 362/200, 205, 208, 253, 396, 398; 15/210 B

[56] References Cited

U.S. PATENT DOCUMENTS

| | | | |
|---|---|---|---|
| 3,098,254 | 7/1963 | Rose | 15/210 B |
| 4,374,445 | 2/1983 | Wilson | 15/210 B |
| 4,380,841 | 4/1983 | Thomas | 15/210 B |

*Primary Examiner*—Stephen F. Husar
*Attorney, Agent, or Firm*—Douglas S. Bishop

[57] ABSTRACT

A vehicle accessory device for utilization in monitoring vehicle fluid levels comprising a pair of opposed wiping pads, an associated flashlight within the same housing structure and a magnet or other means for securing the device when not in use.

14 Claims, 2 Drawing Sheets

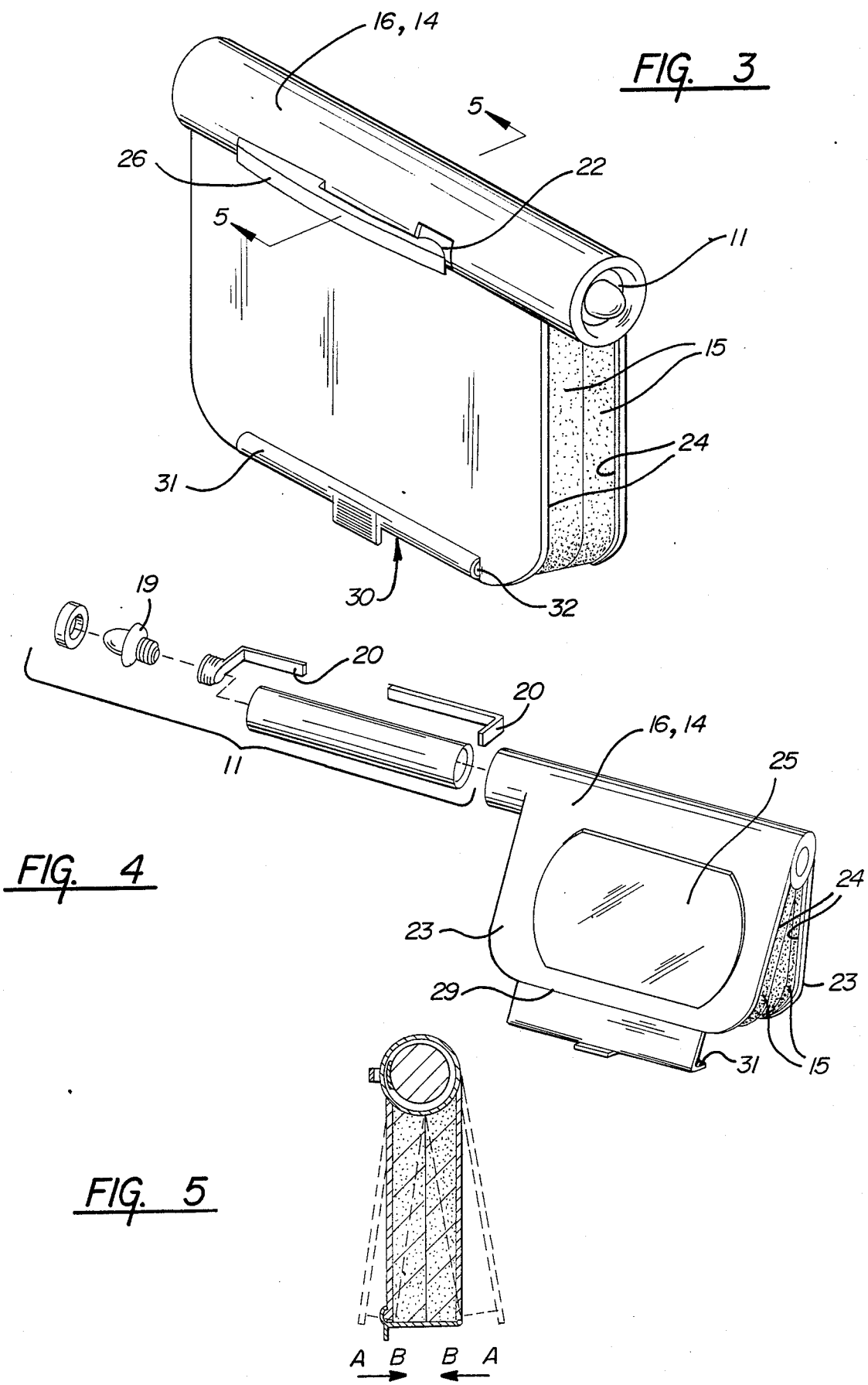

OIL CHECK LIGHT

FIELD OF THE INVENTION

This invention relates generally to vehicle accessory devices and in particular to vehicle accessory devices utilized in the monitoring of engine oil and other fluid levels. Most particularly, the present invention relates to an oil or other fluid level monitoring device which includes opposed wiping pads, an associated flashlight within the same housing structure and a means to secure the device to the vehicle when not in use.

BACKGROUND OF THE INVENTION

Maintenance of proper fluid levels is an important operational safeguard in engines and other lubricated machines, particularly motor vehicle engines, transmissions and other systems. As an example, failure to maintain appropriate levels of engine oil, automatic transmission fluid or brake fluid, can result in excessive wear, or even complete failure of engine, transmission, or brake system. Automobiles and other vehicles generally come equipped with incorporated dipsticks for measuring fluid levels.

The frequency at which vehicular fluids must be monitored generally increases at a rate roughly proportionate to frequency and extent of vehicular use. Accordingly, vehicular fluids must frequently be monitored in locations removed from the vehicle's home base. Such monitoring must also frequently take place at night or under other than optimum lighting conditions. Such monitoring additionally requires, in general, that the measuring device, or dipstick, be initially wiped clean of the particular fluid so that upon insertion into and withdrawal from its housing in the vehicle, the actual fluid level will be readily apparent and may be read from the measuring device, or dipstick.

Vehicular fluids are generally monitored in conjunction with fueling of the vehicle. This method is generally adopted because fuel usage is also generally proportionate to vehicle use. Traditionally, vehicular fluid levels were monitored by the attendant who fueled the vehicle and who generally had at his disposal the means, including wiping materials and artificial light, as required, to accomplish the task. The onset of the self-service gas pump and proliferation of such pumps in settings other than the traditional gasoline service station has, however, had the collateral effect of requiring the vehicle operator, in addition to physically performing the monitoring function, to provide the wiping materials, artificial light, and consequential storage of those items between uses.

Self-service fuel pumps may not be appropriately lighted and may not provide adequate supplies of wiping materials. No attendant may be available to replace these items if the supply has been exhausted. Modern passenger vehicles may lack adequate and accessible storage space for such items, particularly if they have become soiled with vehicular fluids or other residue.

The foregoing problems could be simply and easily obviated if there were available a vehicle accessory device which provided a means for wiping fluid measuring dipsticks, which included a means for illumination of the dipstick and housing and which could be easily secured within the engine compartment of the vehicle. The present invention provides for an accessory device for a motor vehicle, including a pair of opposed wiping pads for use in wiping the dipstick, an associated flashlight housed within the same housing as the pads, for illumination of the dipstick and dipstick housing, and a magnet or other means attached to the housing for use in securing the device in a designed position within the engine compartment of the vehicle when not in use.

By the use of the present invention, complete vehicle fluid level monitoring may be performed by the operator of the vehicle, in any location, under any light conditions without the necessity of separate wiping materials, separate light source or use of normal vehicular storage space. For example, the light may be utilized to initially locate the dipstick. The wiping pads are then utilized to clean the dipstick. The light may again be utilized to re-locate the dipstick housing for fluid measurement and final return, and may also be used to illuminate the dipstick itself in reading the fluid level. Upon completion the device may be stored within the engine compartment without soiling the vehicle or taking up space within the passenger or storage compartments of the vehicle. The present invention also may be used as a flashlight for other vehicular needs unrelated to fluid level monitoring. These and other advantages of the present invention will be readily apparent to one of skill in the art in light of the drawings, discussion, description and claims which follow.

SUMMARY OF THE INVENTION

There is disclosed herein an accessory device for a motor vehicle comprising a pair of opposing wiping pads for use in wiping a dipstick, a flashlight unit associated with the wiping pads and housed within the same housing structure as the wiping pads and a magnet or other fastening device attached to the housing for use in securing the device in a desired position within the engine compartment of the vehicle when not in use. The flashlight unit contains standard flashlight circuitry components and is activated by a switching means. Both the wiping pad function and the light function may operate separately or in concert with each other in a variety of fluid level monitoring situations. A planar dust cover/latch attached to the housing may be closed over the opposed wiping pads compressing them together when not in use. In one embodiment of the invention, the switching means is activated by a clip mechanism which may also be utilized as a fastening device to attach the invention to clothing, wiring or other projecting surface.

BRIEF DESCRIPTION OF THE DRAWINGS

FIG. 3 is a perspective view of the invention with cover closed, illustrating the front and a first side thereof;

FIG. 4 is a partially exploded view of the invention of FIG. 3 illustrating a second side and rear surface thereof and illustrating separated flashlight components thereof;

FIG. 5 is a sectional view taken through line 5—5 of FIG. 3 illustrating the relationship of the opposing wiping pads and the housing, and illustrating the opposing planar surfaces as compressible from position A (shown in phantom outline) to position B.

DETAILED DESCRIPTION OF THE INVENTION

Figure 1:
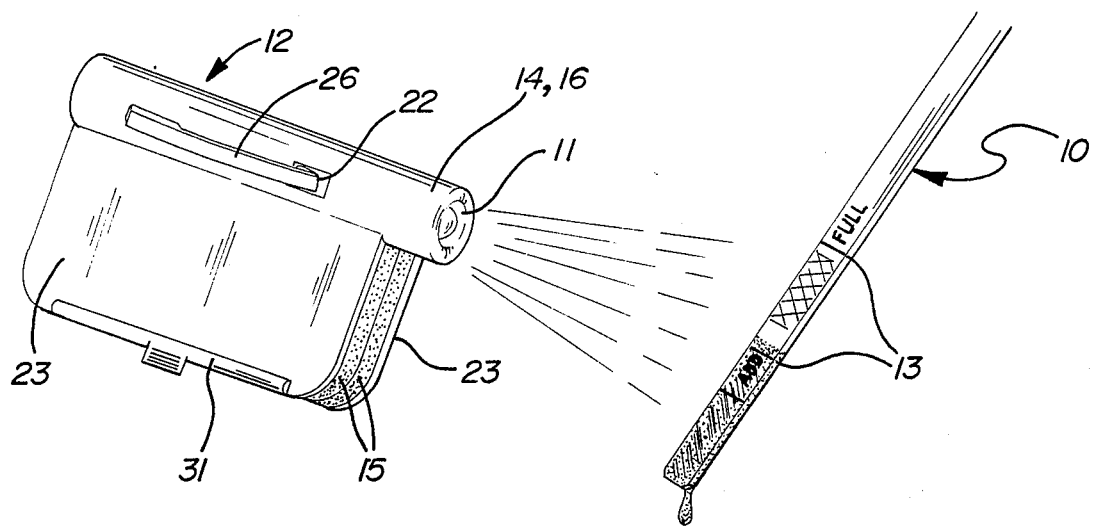
FIG. 1 is a perspective view illustrating how the oil check light may be advantageously employed for illumination purposes.

FIG. 1 depicts the use of the oil check light of the present invention in connection with the illumination of an engine oil dipstick. As previously mentioned, vehicular fluid levels must frequently be monitored at night or in less than optimum light conditions, and such use of the invention obviates the vehicle operator's dependence upon the availability of an alternate artificial light source.

As shown, a dipstick 10 is being illuminated by the flashlight component 11 of the oil check light 12, allowing the operator to observe the monitoring markings 13 on the dipstick 10. The flashlight component 11 is incorporated within the housing structure 14 of the oil check light 12 as will be described in greater detail hereinbelow.

Figure 2:
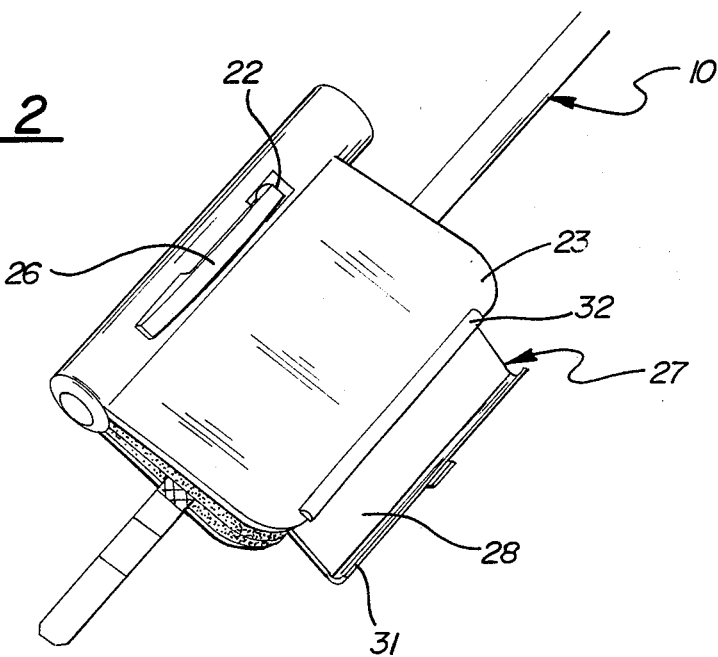
FIG. 2 is a perspective view illustrating how the oil check light may be advantageously employed in its wiping function.

Referring now to FIG. 2. the present invention is shown in connection with the cleaning of an engine oil dipstick. As mentioned above, in monitoring vehicular fluid levels, the measuring dipstick must frequently be wiped clean of the measured fluid or other residue. Such use of the invention will additionally obviate the dependency of the vehicle operator on the availability of alternative wiping materials.

As shown, the dipstick 10 is placed between the opposed wiping pads 15 incorporated within the housing structure 14 of the oil check light 12 as will be described in greater detail hereinbelow. The dipstick 10 contacts the opposed pads 15 which absorb or wipe away the fluid or other residue on the dipstick 10.

Figure 6:
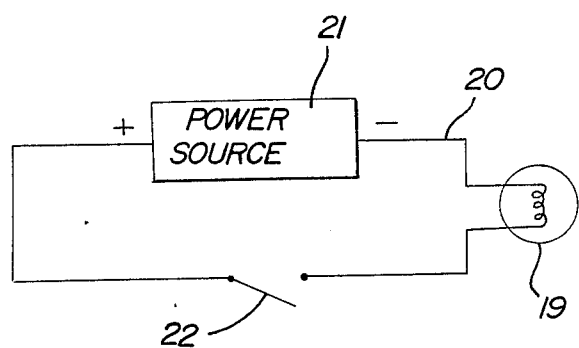
FIG. 6 is a circuit diagram illustrating the electrical circuit of the flashlight mechanism.

In a preferred embodiment of the invention the oil check light comprises a hollow cylindrical member 16. A flashlight component 11 within said hollow cylindrical member incorporating usual flashlight components. including an electric lighting circuit as illustrated in FIG. 6 comprising a light bulb/lens/reflector fixture or other light source 19, circuit electrical connectors or wiring 20, a battery or other power source 21, and a switching means 22 for activating the electric lighting circuit located on the exterior of the primary cylindrical member. Said electrical light circuit and the relationship of the components thereof are further shown by the circuit diagram set forth in FIG. 6.

Extending outwardly from the hollow cylindrical member 16 are a pair of opposed planar members 23, longitudinally aligned and having sufficient space between them to allow the attachment of opposed wiping pads 15 on the interior planar surfaces 24 and the placement of a dipstick 10 between the opposed pads 15. Opposed wiping pads 15 are affixed to the interior surfaces 24 of said opposed planar members 23.

Affixed to one of the planar members 23. as shown in FIG. 4, is a permanent magnet 25, for use in securing the invention to the interior of the vehicle engine compartment for storage when the invention is not in use.

Affixed to the exterior of the principal cylindrical member is a spring clip device 26 for use as an alternative securing device for securing the invention to clothing, wires or other projecting planar surface. In a preferred embodiment of the invention, as shown in FIG. 3, the spring clip device 26 is affixed on the exterior of the principal cylindrical member on the side opposed to the side approximate to the affixed permanent magnet 25 as shown in FIG. 5. In this preferred embodiment the spring clip device 26 may also serve as the switch 22 or other means for activating the electrical light circuit as illustrated in FIG. 6. In another preferred embodiment of the invention, the opposed planar members 23 are constructed of a pliable material so as to allow the operator to compress the opposed wiping pads 15 against the dipstick 10 during the wiping function, or against each other when covered for storage. FIG. 5 illustrates the compressibility of the opposed planar members from position A to position B.

While the opposed wiping pads 15 may be fabricated from any absorbent material, it may be preferred to utilize a sponge or foam material which may be cleaned by petroleum-based solvent or other cleaning solution.

A combination cover/latch 27 comprising a generally rectangular planar member 28 is longitudinally attached to the outward edge of one of the opposed planar members 23 by a hinging means 29 and is moveable from an open position generally in the same plane as said attached planar member to a closed position at right angles to both the planar members 23 and to the exterior edges of said opposed wiping pads 15, and held in such closed position by a fastening means 30. In the preferred embodiment of the invention, said fastening means comprises an inwardly disposed concave lip 31 on the rectangular planar surface and an outwardly disposed convex ridge 32 parallel to the hollow cylindrical member 16 on the outward exterior edge of the opposing planar member 23.

All of the foregoing variations and modifications are well within the abilities of one of skill in the art and in light of such possible modifications, it should be kept in mind that the foregoing drawings, discussion and description are meant merely to illustrate a preferred particular embodiment of the invention and not to be limitations upon the practice thereof. The following claims, including all equivalents, are meant to define the scope of the invention.

What is claimed is:

1. A vehicular fluid level monitoring device comprising:
   (a) a hollow cylindrical member;
   (b) an outwardly directed light source affixed within said hollow cylindrical member;
   (c) an electrical lighting circuit containing electrical connectors or wiring and power source sufficient to provide an electrical connection to said outwardly directed electrical light source affixed within said hollow cylindrical member;
   (d) a means for closing said electrical circuit;
   (e) a pair of longitudinally aligned, opposed planar members extending outwardly from the hollow cylindrical member;
   (f) a pair of opposed wiping pads affixed to the interior surfaces of said opposed planar members.

2. A vehicular fluid level monitoring device as in claim 1, wherein said device includes a means of securing the device to the vehicle when not in use.

3. A vehicular fluid level monitoring device as in claim 1, wherein said device includes a magnet affixed to the exterior of one of the opposed planar members as a means of securing the device to the vehicle when not in use.

4. A vehicular fluid level monitoring device as in claim 5, wherein said device additionally includes a spring clip attached to the exterior of the hollow cylindrical member as a means to secure the device when not in use.

5. A vehicular fluid level monitoring device comprising:
   a. a common housing structure further comprising:
      (i) a hollow cylindrical member;
      (ii) a pair of longitudinally aligned, opposed planar members extending outwardly from said hollow cylindrical member;
   b. a flashlight casing containing usual flashlight components including power source, light source, and electrical circuit forming means sufficient to form an electrical connection;
   c. said flashlight casing and components affixed within the hollow cylindrical member;
   d. a means for closing the electrical circuit;
   e. said means for closing the electrical circuit affixed to the exterior casing of the hollow cylindrical member;
   f. opposed wiping pads affixed to the interior surfaces of said opposed planar members;
   g. a means of securing said device to the vehicle when not in use affixed to the exterior of said common housing structure.

6. A vehicular fluid level monitoring device as in claim 5, wherein the means of securing said device to the vehicle is a permanent magnet.

7. A vehicular fluid level monitoring device as in claim 5, wherein the menas of securing said device to the vehicle is a spring clip.

8. A vehicular fluid level monitoring device as in claim 5, wherein said device may be attached to the vehicle by alternative means, comprising of a permanent magnet affixed to one exterior surface of the common housing structure and a spring clip attached to the exterior of the common housing structure on the side opposite the magnet.

9. A vehicular fluid level monitoring device, as in claim 5, 5, wherein the entire device, exclusive of the flashlight components and mechanism, opposed wiping pads and means of securing the device when not in use, is constructed of one piece, molded plastic.

10. A vehicular fluid level monitoring device as in claim 5, wherein the opposed wiping pads are fabricated out of oil-resistant foam material.

11. A vehicular fluid level monitoring device as in claim 5, wherein the opposed wiping pads are fabricated out of polypropylene foam.

12. A vehicular fluid level monitoring device as in claim 5, wherein the opposed planar members are fabricated of pliable material so as to permit compression of the wiping pads affixed to the interior surfaces of said planar members.

13. A vehicular fluid monitoring device as in claim 5, wherein said device includes a combination cover and latch comprising:
   (a) a rectangular planar member longitudinally aligned with said hollow cylindrical member;
   (b) a hinging means affixing said member to the outward edge of one of said opposed planar surfaces, sufficient to allow a range of motion of said rectangular surface member, from a position wherein the planar surface of said member is in the same plane as the planar surface to which it is affixed, to a position wherein the planar surface of said rectangular member and the planar surface of the member to which it is affixed form a right angle;
   (c) a fastening means for affixing the outward edge of said rectangular planar surface to the outward edge of the planar member opposing the planar member to which said rectangular planar member is affixed by said hinging means.

14. A vehicular fluid monitoring device as in claim 13, wherein said fastening means comprises an inwardly disposed concave lip along the outermost edge of the rectangular planar surface member and an outwardly convex ridge lying parallel to the hollow cylindrical member along the outermost exterior edge of the planar member opposing the planar member to which said rectangular planar member is attached.

* * * * *